(12) United States Patent
Korner

(10) Patent No.: US 7,319,279 B2
(45) Date of Patent: Jan. 15, 2008

(54) WIND-DRIVEN ELECTRICAL POWER GENERATING APPARATUS

(76) Inventor: Barry Joe Korner, 1630 S. Redbud Ave., Broken Arrow, OK (US) 74012

( * ) Notice: Subject to any disclaimer, the term of this patent is extended or adjusted under 35 U.S.C. 154(b) by 76 days.

(21) Appl. No.: 11/370,687

(22) Filed: Mar. 8, 2006

(65) Prior Publication Data

US 2007/0210585 A1    Sep. 13, 2007

(51) Int. Cl.
*F03D 9/00* (2006.01)
(52) U.S. Cl. .................... 290/55; 290/44; 415/4.2
(58) Field of Classification Search ............ 290/43, 290/44, 54, 55; 415/4.2, 4.4, 2
See application file for complete search history.

(56) References Cited

U.S. PATENT DOCUMENTS

| | | | | |
|---|---|---|---|---|
| 3,339,078 | A * | 8/1967 | Crompton | 290/44 |
| 4,012,163 | A * | 3/1977 | Baumgartner et al. | 415/208.3 |
| 4,031,405 | A * | 6/1977 | Asperger | 290/55 |
| 4,057,270 | A * | 11/1977 | Lebost | 290/54 |
| 4,533,292 | A * | 8/1985 | Sugihara et al. | 415/211.1 |
| 4,606,697 | A * | 8/1986 | Appel | 415/4.4 |
| 5,038,049 | A * | 8/1991 | Kato | 290/55 |
| 5,982,046 | A * | 11/1999 | Minh | 290/55 |
| 6,688,842 | B2 * | 2/2004 | Boatner | 415/4.2 |
| 7,040,859 | B2 * | 5/2006 | Kane | 415/4.2 |

* cited by examiner

*Primary Examiner*—Nicholas Ponomarenko
(74) *Attorney, Agent, or Firm*—Raymond M. Galasso; Galasso & Associates, LP; David O. Simmons

(57) ABSTRACT

A power generating apparatus comprises an electrical power generating device, a vane-carrying structure and a mounting flange. The electrical power generating device includes a body and a power input shaft extending from within the body. The body is generally cylindrical shaped with opposing end portions. The power input shaft extends from a first end portion of the body and a power cord extends from within the body adjacent a second end portion of the body. The vane-carrying structure is attached to the power input shaft and includes a plurality of elongated vanes each have a longitudinal axis that extends generally parallel to a rotational axis of the power input shaft. The vanes are evenly spaced around the power input shaft. The mounting flange is positioned between the vane-carrying structure and the body of the electrical power generating device and is attached to the body of the electrical power generating device. The power input-shaft extends through an aperture of the mounting flange.

19 Claims, 2 Drawing Sheets

WIND-DRIVEN ELECTRICAL POWER GENERATING APPARATUS

FIELD OF THE DISCLOSURE

The disclosures made herein relate generally to wind-driven electrical power generating apparatuses and, more particularly, to wind-driven electrical power generating apparatuses specifically configured for being mounted on a roof of a building structure.

BACKGROUND

The practice of generating electrical power from free current winds (i.e., naturally occurring wind) is well known. A vaned body is connected to a power input shaft of an electrical power generating device, thereby forming a wind-driven electrical power generating apparatus. A generator and an alternator are examples of an electrical power generating device. In a mounted position, the vaned body is exposed to free wind currents such that they turn the power input shaft of the electrical power generating device. Rotation of the power input shaft at a sufficient rotational speed results in the electrical power generating device generating electrical power.

Generating electrical power from free wind currents is desirable for a number of reasons. One reason is that it reduces dependence on petroleum-based fuels. Another reason is that it does not directly contribute to environmental pollution. Still another reason is that it produces electricity at a relatively low cost. Accordingly, in geographic locations where free wind currents are common, generating electrical power from such free wind currents using a wind-driven electrical power generating apparatus is generally advantageous, desirable and useful.

SUMMARY OF THE DISCLOSURE

The present invention relates to wind-driven electrical power generating apparatuses. Embodiments of wind-driven electrical power generating apparatuses in accordance with the present invention are configured for being conveniently and simply mounted on a roof of a building structure. Exposure to free wind currents causes a wind-driven electrical power generating apparatus in accordance with the present invention to generate electrical power. The magnitude of such wind power is dependent upon factors such as, for example, the specifications of the wind-driven electrical power generating apparatus and the wind velocity.

In one embodiment of the present invention, a wind-driven electrical power generating apparatus comprises an electrical power generating device, a vane-carrying structure and a mounting flange. The electrical power generating device includes a body and a power input shaft extending from within the body. The vane-carrying structure is attached to the power input shaft of the electrical power generating device. The vane-carrying structure includes a plurality of elongated vanes longitudinally extending generally parallel to a rotational axis of the power input shaft. The vanes are generally uniformly positioned with respect to a longitudinal axis of the power input shaft. The mounting flange is attached to the body of the electrical power generating device.

In another embodiment of the present invention, a wind-driven electrical power generating apparatus comprises an electrical power generating device, a vane-carrying structure and a mounting flange. The electrical power generating device includes a body and a power input shaft extending from within the body. The body is generally cylindrical shaped with opposing end portions. The power input shaft extends from a first one of the end portions and a power cord extends from within the body adjacent a second one of the end portions. The vane-carrying structure is attached to the power input shaft of the electrical power generating device. The vane-carrying structure includes a plurality of elongated vanes each having a longitudinal axis extending generally parallel to a rotational axis of the power input shaft. The vanes are evenly spaced around the power input shaft. The mounting flange is positioned between the vane-carrying structure and the body of the electrical power generating device. The mounting flange is attached to the body of the electrical power generating device. The mounting flange includes a first side, a second side and an aperture extending between the first side and the second side. The power input shaft of the electrical power generating device extends through the aperture.

In another embodiment of the present invention, a kit includes components for constructing a wind-driven electrical power generating apparatus. The kit comprises a mounting flange, an electrical power generating device and a vane-carrying structure. The mounting flange has opposed major faces and an aperture extending between the opposed major faces. The electrical power generating device includes a body and a power input shaft extending from within the body. The body is generally cylindrical shaped with opposing end portions. The power input shaft extends from a first one of the end portions and a power cord extends from within the body adjacent a second one of the end portions. The first one of the end portions of the body includes an attachment flange configured for being engaged with one of the major faces of the mounting flange in a manner such that the power input shaft of the electrical power generating device extends through the aperture of the mounting flange. The vane-carrying structure includes a hub attachable to the power input shaft of the electrical power generating device. The vane-carrying structure includes a plurality of elongated vanes each having a longitudinal axis extending generally parallel to a longitudinal axis of the hub. The vanes are evenly spaced around the hub.

Turning now to specific aspects of the present invention, in at least one embodiment, the vane-carrying structure includes spaced-apart end plates, the end plates are generally round, a longitudinal axis of each one of the ends plates is generally aligned with the rotational axis of the power input shaft, the vanes are attached between the end plates and an outer edge of each one of the vanes is generally flush with an outer edge of each one of the end plates.

In at least one embodiment of the present invention, the body of the electrical power generating device has opposing end faces, a first one of the end faces is exposed at a first end portion of the body and a second one of the end faces is exposed at a second end portion of the body, the power input shaft extends through the first one of the end faces of the body and the plurality of elongated vanes longitudinally extend generally parallel with a longitudinal axis of the body.

In at least one embodiment of the present invention, the mounting flange is positioned between the body of the electrical power generating device and the vane-carrying structure, the mounting flange includes a first side, a second side and an aperture extending between the first side and the second side, and the power input shaft of the generator extends through the aperture.

In at least one embodiment of the present invention, a power cord extends from within the body through the second one of the end faces of the body.

In at least one embodiment of the present invention, the first end portion of the body of the electrical power generating device is positioned within an interior space of the vane-carrying structure between the vanes, the second end portion of the body extends from with the interior space of the vane-carrying structure, the power input shaft extends from within the first end portion of the body, and the mounting flange is attached to the second end portion of the body.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
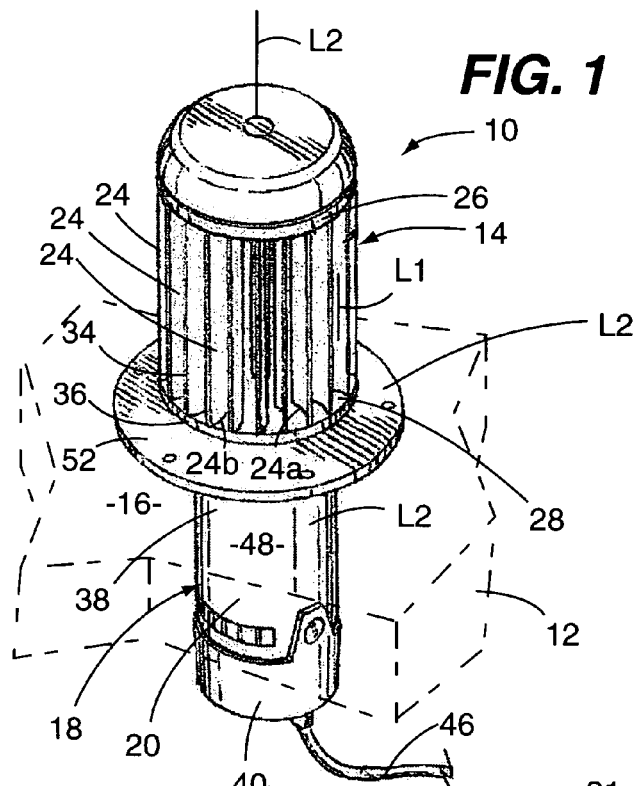
FIG. 1 is a perspective view showing an embodiment of a wind-driven electrical power generating apparatus in accordance with the present invention, wherein an electrical power generating device of the wind-driven electrical power generating apparatus is mountable within an interior space of a roof structure.
Figure 2:
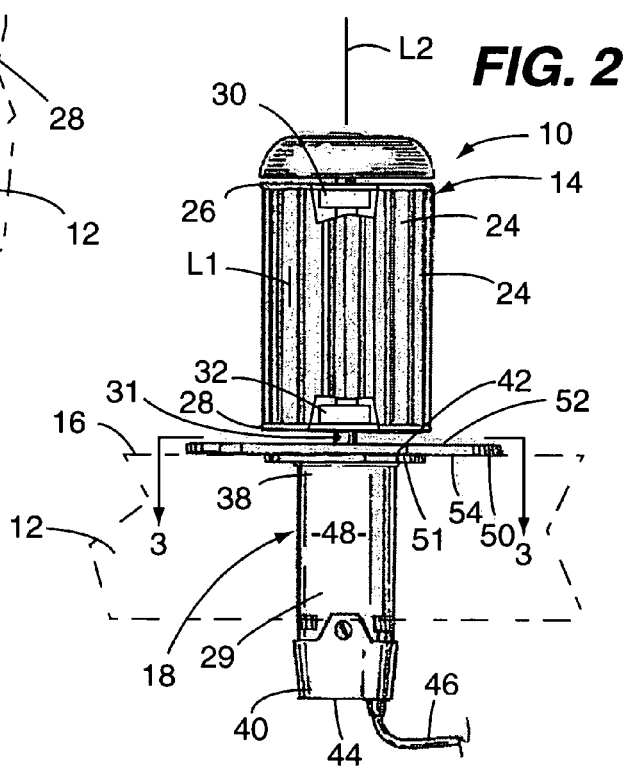
FIG. 2 is a partial fragmentary side view of the wind-driven electrical power generating apparatus shown in FIG. 1.
Figure 3:
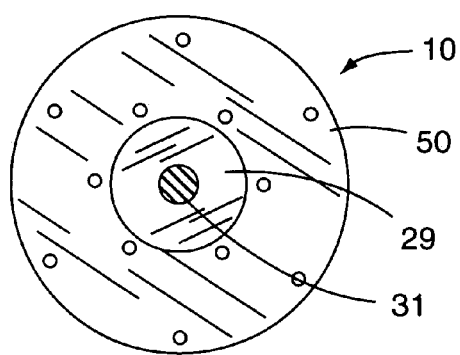
FIG. 3 is a cross-sectional view taken along the line 3-3 in FIG. 2.

FIGS. 1-3 show a first embodiment of a wind-driven electrical power generating apparatus in accordance with the present invention, which is referred to herein as the power generating apparatus 10. The power generating apparatus 10 is configured for being attached to a building roof structure 12. More specifically, the power generating apparatus 10 is configured such that a vane-carrying structure 14 of the power generating apparatus 10 is positioned entirely above an exterior surface 16 of the building roof structure 12 and an electrical power generation device 18 of the power generating apparatus 10 is positioned entirely below the exterior surface 16 of the building roof structure 12.

As shown in FIG. 2, the vane-carrying structure 14 includes a plurality of elongated vanes 24, an upper end plate 26, a lower end plate 28, an upper hub 30 (FIG. 2) and a lower hub 32 (FIG. 2). The end plates (26, 28) are generally round. The upper hub 30 is attached to the upper end plate 26 and the lower hub 32 is attached to the lower end plate 28. Each one of the vanes 24 extends between and is attached between the end plates (26, 28). As best shown in FIG. 1, an outer edge 34 of each one of the elongated vanes 24 is generally flush with an outer edge 36 of each one of the end plates (26, 28). Each one of the elongated vanes 24 have a longitudinal axis L1 extending generally parallel to a longitudinal axis L2 of the hubs (26, 28). The elongated vanes 24 are preferably, but not necessarily, radially and angularly spaced in an even manner with respect to the longitudinal axis L2 of the hubs (26, 28).

As best shown in FIG. 1, each one of the elongated vanes 24 preferably, but not necessarily, has an arcuate cross-sectional profile. More specifically, as viewed along the longitudinal axis L1 of each one of the elongated vanes 24, each one of the elongated vanes 24 has a generally concave-shaped face 24a and a generally convex-shaped face 24b opposite the generally concave face 24a. The arcuate cross-sectional profile serves to create a pressure drop across each elongated vane 24 when exposed to free wind current blowing into the vane-carrying structure 14. In combination with force exerted upon each elongated vane 24 by direct impingement of the free wind currents on the elongated vanes 24, the pressure drop results in rotation of the vane-carrying structure 14 about the longitudinal axis L2 of the hubs (30, 32).

The power generating device 18 includes a body 29 and a power input shaft 31 (FIG. 2) extending from within the body 29. The power input shaft 31 of the power generating device 18 extends into engagement with the upper hub 30 and the lower hub 32. A rotational axis of the power input shaft 31 extends generally coincidental with the longitudinal axis L2 of the hubs (30, 32). Movement of the hubs (30, 32) with respect to the power input shaft 31 is limited by means such as, for example, an interference fit between the hubs (30, 32) and the power input shaft 31 and/or mechanical retention articles such as setscrews.

Preferably, but not necessarily, the body 29 of the electrical power generating device 18 is generally cylindrical shaped with a first end portion 38 and a second end portion 40 opposite the first end portion 38. The first end portion 38 has a first end face 42 and the second end portion 40 has a second end face 44 that is generally opposite the first end face 42. The power input shaft 31 extends through the first end face 42.

An alternator and a generator are known examples of the power generating device 18 and, in general, electrical power generating devices in accordance with the present invention. The construction and operation of alternators and generators are well known and will not be discussed herein in detail. In general, the power input shaft 31 facilitates spinning of a first portion of the power generating device 18 (e.g., movable windings) relative to a second portion of the power generating device (e.g., stationary windings). Accordingly, through rapid rotation of the power input shaft 31, the power generating device 18 generates an electrical current at a particular voltage.

Power generated by the power generating device 18 is accessibly via a power cord 46. The power cord 46 extends from within the body 29 adjacent the second end portion 40 of the body 29. In one embodiment, the power cord 46 extends from a side face 48 of the body 29. In another embodiment (FIG. 2), the power cord 46 extends from the second end face 44 of the body 29.

A mounting flange 50 is positioned between the body 29 and the vane-carrying structure 14. An attachment flange 51 (FIG. 2) of the mounting flange 50 is attached to the body 29 of the power generating device 18. The mounting flange 50 includes a first side 52, a second side 54 and an aperture 56 (FIG. 3) extending between the first side 52 and the second side 54. The mounting flange 50 is attached to the second end portion 40 of the body 29. The power input shaft 31 of the power generating device 18 extends through the aperture 56.

Figure 4:
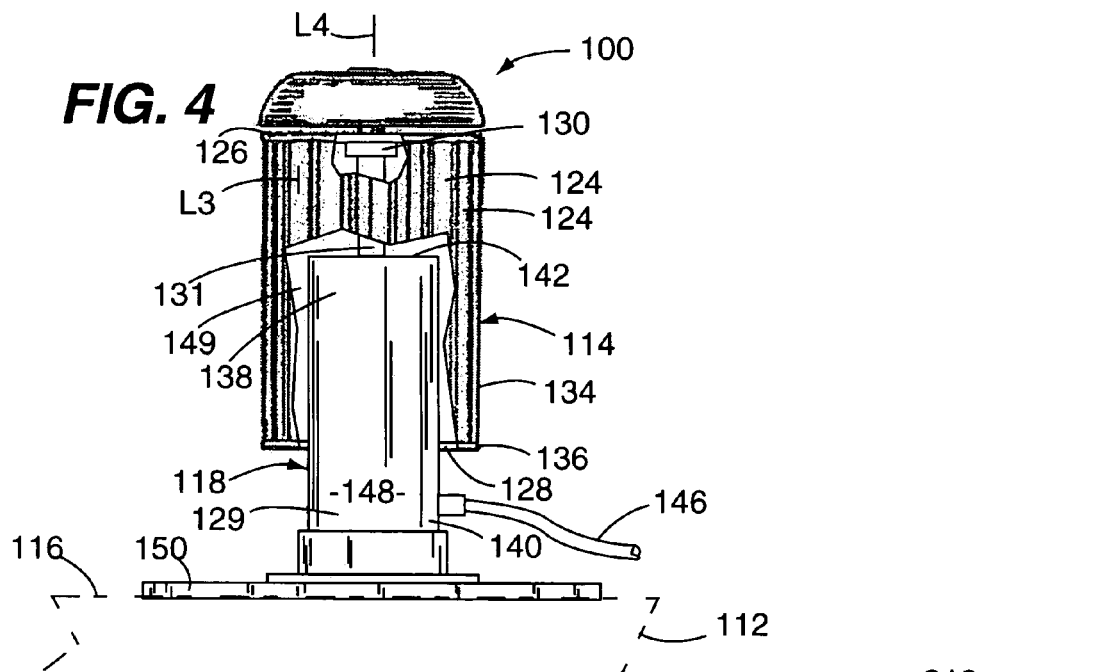
FIG. 4 is a perspective view showing an embodiment of a wind-driven electrical power generating apparatus in accordance with the present invention, wherein an electrical power generating device of the wind-driven electrical power generating apparatus is mountable on an exterior portion of a roof structure.

FIG. 4 shows a second embodiment of a wind-driven electrical power generating apparatus in accordance with the present invention, which is referred to herein as the power generating apparatus 100. The power generating apparatus 100 is configured for being attached to a building roof structure 12. More specifically, the power generating apparatus 100 is configured such that a vane-carrying carrying structure 114 of the power generating apparatus 100 and an electrical power generation device 118 of the power generating apparatus 100 are each positioned entirely above the exterior surface 116 of the building roof structure 112.

As shown in FIG. 4, the vane-carrying structure 114 includes a plurality of elongated vanes 124, an upper end plate 126, a lower end plate 128 and a hub 130. Each one of the elongated vanes 124 preferably, but not necessarily, has an arcuate cross-sectional profile such has the profile of the vanes 24 shown in FIG. 1. The upper and lowerend plates (126, 128) are generally round. The hub 130 is attached to the upper end plate 126. Each one of the vanes 124 is attached between the end plates (126, 128). An outer edge 134 of each one of the elongated vanes 124 is generally flush with an outer edge 136 of each one of the end plates (126, 128). Each one of the elongated vanes 124 have a longitudinal axis L3 extending generally parallel to a longitudinal axis L4 of the hubs (126, 128). The elongated vanes 124 are preferably, but not necessarily, radially and angularly spaced in an even manner with respect to the longitudinal axis L4 of the hubs (126, 128).

The power generating device 118 includes a body 129 and a power input shaft 131 extending from within the body 129. The power input shaft 131 of the power generating device 118 extends into engagement with the hub 130. Movement of the hub 130 with respect to the power input shaft 131 is limited by means such as, for example, an interference fit between the hub 130 and the power input shaft 131 and/or mechanical retention articles such as setscrews.

Preferably, but not necessarily, the body 129 of the electrical power generating device 118 is generally cylindrical shaped with a first end portion 138 and a second end portion 140 opposite the first end portion 138. The first end portion 138 has a first end face 142 and the second end portion 140 has a second end face (not specifically shown) that is generally opposite the first end face 142. The power input shaft 131 extends through the first end face 142.

Power generated by the power generating device 118 is accessibly via a power cord 146. The power cord 146 extends from within the body 129 adjacent the second end portion 40 of the body 29. The power cord 46 extends from a side face 148 of the body 129.

The first end portion 139 of the body 129 is positioned within an interior space 149 of the vane-carrying structure 114. The second end portion 140 of the body 129 extends from with the interior space 149 of the vane-carrying structure 114. The power input shaft 131 extends through the first end face 142 of the first end portion 139 of the body 129. A mounting flange 150 is attached to the second end portion 140 of the body 129.

Figure 5:
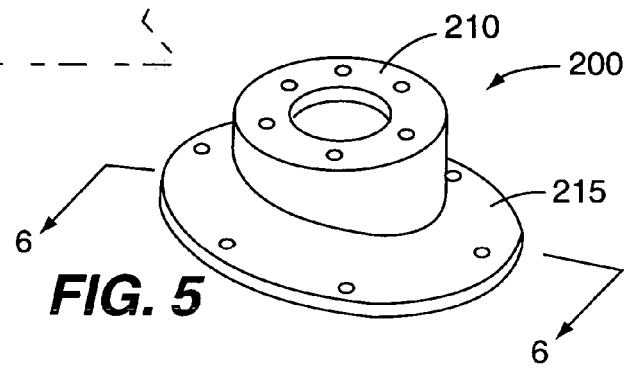
FIG. 5 is a perspective view showing an embodiment of a wedge-shaped mounting flange in accordance with the present invention.
Figure 6:
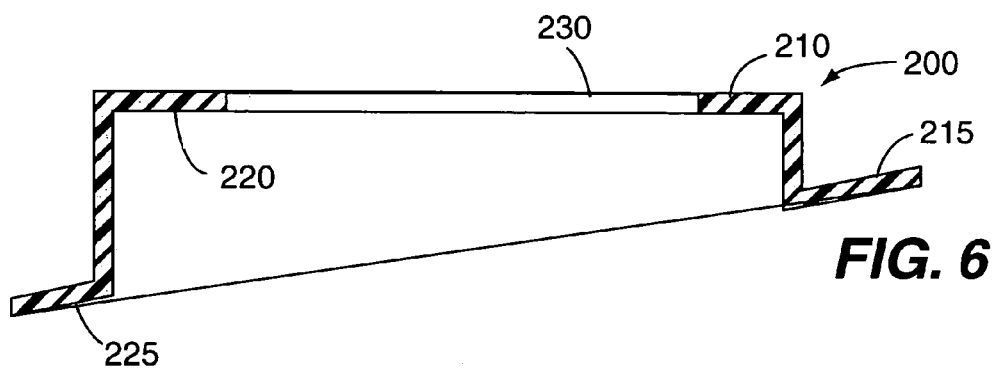
FIG. 6 is a cross-sectional view taken along the line 6-6 in FIG. 5.

As shown in FIGS. 1-4, a mounting flange in accordance with one embodiment of the present invention is generally flat. Such a mounting flange is best used on a roof structure with a zero pitch as it maintains a rotational axis of an attached vane-carrying structure substantially perpendicular with a horizontal building structure plane (e.g., a building surface of a slab or foundation). However, in accordance with the present invention, a wedge-shaped mounting flange 200, as shown in FIGS. 5 and 6, is preferred for building structures that have a pitched roof structure (i.e., skewed with respect to a horizontal building structure plane). The wedge-shaped mounting flange 200 serves to maintain a rotational axis of an attached vane-carrying structure substantially perpendicular with a horizontal building structure plane (e.g., a building surface of a slab or foundation). The wedge shaped mounting flange 200 includes a power generating device engagement portion 210 to which a power generating device is attached and a roof engagement portion 215 that is attached to a pitched roof structure. As shown in FIG. 6, an engagement member 220 of the power generating device engagement portion 210 is skewed with respect to an engagement member 225 of the roof engagement portion 215. A power input shaft of an attached power generating device extends through an aperture 230 within the engagement member 220 of the power generating device engagement portion 210.

In one embodiment of the present invention, a kit is provided for constructing a wind-driven electrical power generating apparatus. One embodiment of such a kit includes the mounting flange, the electrical power generating device and the vane-carrying structure of the wind-driven electrical power generating apparatus shown in FIGS. 1-3. Another embodiment of such a kit includes the mounting flange, the electrical power generating device and the vane-carrying structure of the wind-driven electrical power generating apparatus shown in FIG. 4. Alternatively, such kits may include a mounting flange such as that shown in FIGS. 5 and 6.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A wind-driven electrical power generating apparatus, comprising:

an electrical power generating device including a body and a power input shaft extending from within the body;

a vane-carrying structure attached to the power input shaft of the electrical power generating device, wherein the vane-carrying structure includes a plurality of elongated vanes longitudinally extending generally parallel to a rotational axis of the power input shaft and wherein the vanes are generally uniformly positioned with respect to a longitudinal axis of the power input shaft; and a mounting flange attached to the body of the electrical power generating device.

2. The apparatus of claim 1 wherein:
the vane-carrying structure includes spaced-apart end plates;
said end plates are generally round;
a longitudinal axis of each one of said ends plates is generally aligned with the rotational axis of the power input shaft;
said vanes are attached between said end plates; and
an outer edge of each one of said vanes is generally flush with an outer edge of each one of said end plates.

3. The apparatus of claim 1 wherein:
the body of the electrical power generating device has opposing end faces;
a first one of said end faces is exposed at a first end portion of the body and a second one of said end faces is exposed at a second end portion of the body;
the power input shaft extends through the first one of said end faces of the body; and
each one of said elongated vanes longitudinally extends generally parallel with a longitudinal axis of the body.

4. The apparatus of claim 1 wherein:
the mounting flange is positioned between the body of the electrical power generating device and the vane-carrying structure;
the mounting flange includes a first side, a second side and an aperture extending between the first side and the second side; and
the power input shaft of the electrical power generating device extends through the aperture.

5. The apparatus of claim 4 wherein:
the body of the electrical power generating device is generally elongated with opposing end faces;
a first one of said end faces is exposed at a first end portion of the body and a second one of said end faces is exposed at a second end portion of the body;
the power input shaft extends through the first one of said end faces of the body; and
each one of said vanes longitudinally extends generally parallel with a longitudinal axis of the body.

6. The apparatus of claim 5 wherein a power cord extends from within the body through the second one of said end faces of the body.

7. The apparatus of claim 6 wherein:
the vane-carrying structure includes spaced-apart end plates;
said end plates are generally round;
a longitudinal axis of each one of said ends plates is generally aligned with the rotational axis of the power input shaft;
said vanes are attached between said end plates; and
an outer edge of each one of said vanes is generally flush with an outer edge of each one of said end plates.

8. The apparatus of claim 1 wherein:
a first end portion of the body of the electrical power generating device is positioned within an interior space of the vane-carrying structure between said vanes;
a second end portion of the body extends from with the interior space of the vane-carrying structure;
the power input shaft extends from within the first end portion of the body; and
the mounting flange is attached to the second end portion of the body.

9. The apparatus of claim 8 wherein:
the body of the electrical power generating device is generally elongated with opposing end faces;
a first one of said end faces is exposed at the first end portion of the body and a second one of said end faces is exposed at the second end portion of the body;
the power input shaft extends through the first one of said end faces of the body; and
each one of said elongated vanes longitudinally extends generally parallel with a longitudinal axis of the body.

10. The apparatus of claim 9 wherein a power cord extends from within the body through the second end face of the body.

11. The apparatus of claim 10 wherein:
the vane-carrying structure includes spaced-apart end plates;
said end plates are generally round;
a longitudinal axis of each one of said ends plates is generally aligned with the rotational axis of the power input shaft;
said vanes are attached between said end plates; and
an outer edge of each one of said vanes is generally flush with an outer edge of each one of said end plates.

12. A wind-driven electrical power generating apparatus, comprising:
an electrical power generating device including a body and a power input shaft extending from within the body, wherein the body is generally cylindrical shaped with opposing end portions and wherein the power input shaft extends from a first one of said end portions and a power cord extends from within the body adjacent a second one of said end portions;
a vane-carrying structure attached to the power input shaft of the electrical power generating device, wherein the vane-carrying structure includes a plurality of elongated vanes each having a longitudinal axis extending generally parallel to a rotational axis of the power input shaft and wherein the vanes are evenly spaced around the power input shaft; and
a mounting flange between the vane-carrying structure and the body of the electrical power generating device, wherein the mounting flange is attached to the body of the electrical power generating device, wherein the mounting flange includes a first side, a second side and an aperture extending between the first side and the second side and wherein the power input shaft of the electrical power generating device extends through the aperture.

13. The apparatus of claim 12 wherein:
the vane-carrying structure includes spaced-apart end plates; and
said vanes are attached between said end plates.

14. The apparatus of claim 12 wherein:
the body of the electrical power generating device is generally elongated with opposing end faces;
a first one of said end faces is exposed at a first one of said end portions of the body and a second one of said end faces is exposed at a second one of said end portions of the body;
the power input shaft extends through the first one of said end faces of the body; and
each one of said elongated vanes longitudinally extends generally parallel with a longitudinal axis of the body.

15. The apparatus of claim 14 wherein:
the vane-carrying structure includes spaced-apart end plates;
said end plates are generally round;
a longitudinal axis of each one of said ends plates is generally aligned with the rotational axis of the power input shaft;

said vanes are attached between said end plates; and an outer edge of each one of said vanes is generally flush with an outer edge of each one of said end plates.

16. A kit including components for constructing a wind-driven electrical power generating apparatus, the kit comprising:

a mounting flange having opposed major faces and an aperture extending between the opposed major faces;

an electrical power generating device including a body and a power input shaft extending from within the body, wherein the body is generally cylindrical shaped with opposing end portions, wherein the power input shaft extends from a first one of said end portions and a power cord extends from within the body adjacent a second one of said end portions and wherein the first one of said end portions of the body includes an attachment flange configured for being engaged with one of said major faces of the mounting flange in a manner such that the power input shaft of the electrical power generating device extends through the aperture of the mounting flange; and a vane-carrying structure including a hub attachable to the power input shaft of the electrical power generating device, wherein the vane-carrying structure includes a plurality of elongated vanes each having a longitudinal axis extending generally parallel to a longitudinal axis of the hub and wherein the vanes are evenly spaced around the hub.

17. The kit of claim 16 wherein:

the vane-carrying structure includes spaced-apart end plates; and said vanes are attached between said end plates.

18. The kit of claim 16 wherein:

the body of the electrical power generating device is generally elongated with opposing end faces;

a first one of said end faces is exposed at the first one of said end portions of the body and a second one of said end faces is exposed at a second one of said end portions of the body;

the power input shaft extends through the first one of said end faces of the body; and each one of said elongated vanes longitudinally extends generally parallel with a longitudinal axis of the body.

19. The kit of claim 18 wherein:

the vane-carrying structure includes spaced-apart end plates;

said end plates are generally round;

a longitudinal axis of each one of said ends plates is generally aligned with a rotational axis of the power input shaft;

said vanes are attached between said end plates; and an outer edge of each one of said vanes is generally flush with an outer edge of each one of said end plates.

* * * * *